United States Patent
Warkentin et al.

(10) Patent No.: US 11,340,909 B2
(45) Date of Patent: May 24, 2022

(54) CONSTRUCTING A UEFI BOOTLOADER HANDOFF ADDRESS SPACE FOR A PHYSICAL MACHINE HOSTING VIRTUAL MACHINES

(71) Applicant: VMware, Inc., Palo Alto, CA (US)

(72) Inventors: Andrei Warkentin, Cambridge, MA (US); Timothy P. Mann, Palo Alto, CA (US); Doug Covelli, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 418 days.

(21) Appl. No.: 16/519,867

(22) Filed: Jul. 23, 2019

(65) Prior Publication Data

US 2021/0026647 A1 Jan. 28, 2021

(51) Int. Cl.
G06F 9/4401 (2018.01)
G06F 12/1009 (2016.01)
G06F 9/30 (2018.01)

(52) U.S. Cl.
CPC ........ G06F 9/4401 (2013.01); G06F 9/30101 (2013.01); G06F 12/1009 (2013.01)

(58) Field of Classification Search
CPC ............... G06F 9/4401; G06F 12/1009; G06F 9/30101; G06F 2212/1032; G06F 2212/1052; G06F 12/109; G06F 12/1441; G06F 2212/651; G06F 2212/657; G06F 12/1483

See application file for complete search history.

(56) References Cited

U.S. PATENT DOCUMENTS

| | | | |
|---|---|---|---|
| 10,185,664 B1 | 1/2019 | Warkentin et al. | |
| 10,379,870 B2 | 8/2019 | Warkentin et al. | |
| 10,552,172 B2 | 2/2020 | Li et al. | |
| 2009/0063835 A1* | 3/2009 | Yao | G06F 9/45558 713/2 |
| 2018/0173539 A1* | 6/2018 | Warkentin | G06F 12/1009 |
| 2019/0391814 A1 | 12/2019 | Warkentin et al. | |
| 2019/0391851 A1* | 12/2019 | Franciosi | G06F 11/0793 |
| 2020/0097313 A1* | 3/2020 | Dong | G06F 12/1036 |

* cited by examiner

*Primary Examiner* — Glenn A. Auve
(74) *Attorney, Agent, or Firm* — Kim & Stewart LLP

(57) ABSTRACT

A method of creating a new page table structure after first stage boot operations has completed but before handoff to a hypervisor occurs. Firmware page tables are reused and copied to a region of memory by a first-stage bootloader while the firmware is running, processed to have an expected multi-stage page table structure and desired access rights, and copied again to another region of memory by the first-stage bootloader after the first-stage bootloader has completed its booting operations and after the firmware has been quiesced.

20 Claims, 8 Drawing Sheets

CONSTRUCTING A UEFI BOOTLOADER HANDOFF ADDRESS SPACE FOR A PHYSICAL MACHINE HOSTING VIRTUAL MACHINES

BACKGROUND

For nearly forty years, the Basic Input/Output System (BIOS) has been a standard type of boot firmware used to perform hardware initialization during the booting process on personal computers (PCs). BIOS also provides run-time services for an operating system and programs after booting of the operating system. The fundamental purposes of the BIOS in PCs are to initialize and test the system hardware components, and to load a bootloader and subsequently an operating system from a mass memory device or network storage. A bootloader is a program that starts when a computer device is powered on, and which performs certain boot functions and then hands off control to an operating system (OS). The BIOS additionally provides an abstraction layer for the hardware until drivers are loaded. As such, variations in the system hardware are hidden by the BIOS from programs that use BIOS services instead of directly accessing the hardware.

Unified Extensible Firmware Interface (UEFI) has been developed as a successor to BIOS, aiming to address technical shortcomings of BIOS. Today, new PC hardware predominantly ships with UEFI. UEFI is applicable across a wide range of devices (servers, workstations, etc.) and central processing units (CPUs) (x64, ARM64®, etc.).

A UEFI bootloader operates in 1:1 mapping mode, wherein virtual addresses are identically mapped to physical addresses. For hosts of virtual machines, such as machines that run a hypervisor, such as VMWare's ESXi®, as system software, before the machine hands off control to the hypervisor from a boot program vmkBoot, the bootloading functions performed by the UEFI bootloader must safely and correctly place hypervisor components at desired system memory locations.

Upon power up of a machine, the machine's boot firmware performs power-on self-test (POST), and then hands off control to a UEFI bootloader, which is a first-stage bootloader that loads a second stage bootloader in memory, loads modules and components needed to run the hypervisor in memory, locates the necessary system information tables, builds a hand-off state from UEFI to the hypervisor, quiesces (i.e., pauses and thereby disables from being executed on the machine) the boot firmware, relocates everything loaded into memory into known addresses that the hypervisor can access, and that finally hands off control to the second stage bootloader. The first-stage bootloader then loads into system memory 'vmkBoot', which is a boot application stored in a predetermined location in RAM, for execution by the machine once the first-stage bootloader has completed its tasks.

UEFI is a complex and rich environment, with code operating in an address space with a memory management unit (MMU) enabled. Additionally, UEFI runs with various safeguards in place by the machine's boot firmware to catch malignant behavior such as that caused by boot viruses. Such safeguards may involve using non-executable (NX) and read-only (RO) restrictions on memory locations (e.g., RAM) for protection against boot viruses that may attempt to write into boot regions of the memory.

System software kernels typically use low virtual addresses for portions of early bootstrap and initialization, typically the lowest 4 GB (to be compatible with legacy BIOS boot firmware). However, the desired system memory locations in the low virtual address spaces can be in use by UEFI boot firmware. As a result, the hand-off from the first-stage bootloader to the 'vmkBoot' component is necessarily complicated by the need to move loaded hypervisor components into areas that overlap areas used by the UEFI boot firmware prior to it being quiesced. Such areas include the UEFI boot firmware code, UEFI boot firmware data and important data structures such as the CPU page tables.

To safely and correctly relocate hypervisor components after exiting UEFI and prior to launching them via the system software kernel, the UEFI bootloader switches to its own address space with its own set of page tables.

The UEFI bootloader requires its own address space with its own set of page tables for at least the following reasons:

1) The boot firmware page tables used by UEFI reflect the needs of the boot firmware environment, not the needs of the hypervisor bootloader. As an example, only memory allocated through the boot firmware may be accessible as writable. As another example, only memory ranges corresponding to executable portions of loaded UEFI drivers and applications are mapped executable. On the other hand, the hypervisor bootloader requires unrestricted access to all physically-available memory ranges. For example. it may require an area of memory to be executable, which incidentally in a particular environment may have been marked as no-execute protected.

2) The boot firmware page tables may themselves be mapped as non-writable (as a safety feature so that the page tables cannot be overwritten by malicious code), preventing them from being modified in place. This means the first-stage hypervisor bootloader cannot simply modify the existing page tables in place to remove any read-only or no-execute restrictions.

3) The boot firmware page tables may be located in a particular portion of the memory that the bootloader may be reusing. In particular, if any boot module is linked to load at a fixed address in memory, it is necessary that the page tables to be used by the hypervisor are not located at that fixed address. For x86 machines, the multiboot "system software kernel" (referred to herein as vmkBoot) is required to be stored at a fixed address in memory, and if the boot firmware page tables are located at that fixed address in memory, this poses a problem that will lead to crashing of the machine.

SUMMARY

One or more embodiments provide a method of booting a machine. The method includes a step of executing boot firmware, which hands off control to a first-stage bootloader; executing first-stage bootloader operations using page tables set up by the boot firmware; after completion of the first-stage bootloader operations but prior to handing off control of the machine to a second-stage bootloader, moving the firmware page tables from a first address region in memory to a second address region in the memory; creating an updated set of page tables in the second region of the memory by modifying a hierarchical structure of the firmware page tables to have an expected number of page table levels; and modifying page table entries in each page table of the updated set of page tables such that each page table entry is accessible by a system software kernel when control of the machine is handed off from the second stage bootloader to the system software kernel.

Further embodiments include, without limitation, a non-transitory computer-readable storage medium that includes instructions for a processor to carry out the above method,

DETAILED DESCRIPTION

Figure 1:
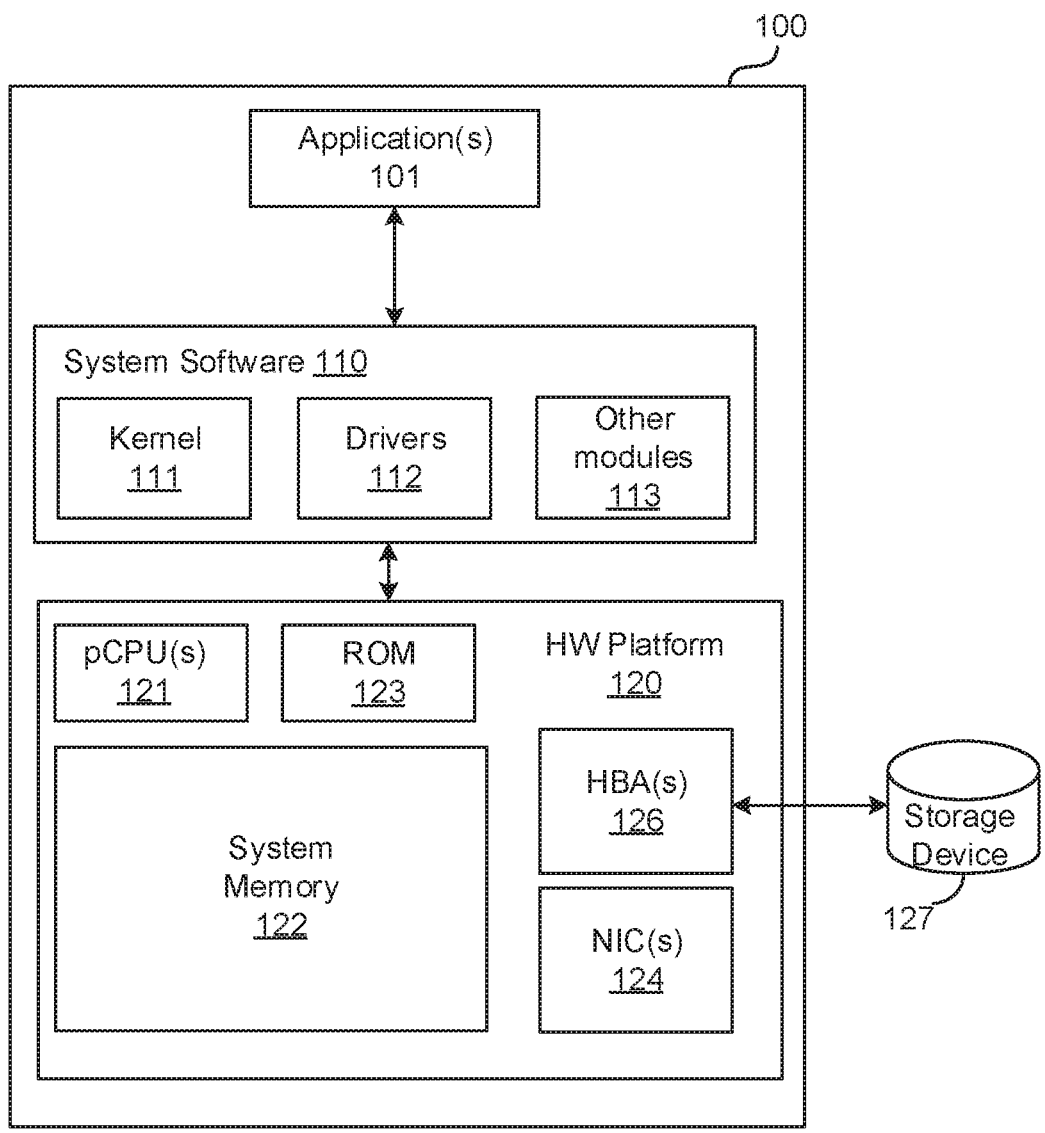
FIG. 1 is a block diagram of a computer system in which one or more embodiments may be implemented.

FIG. 1 is a block diagram of a computer system 100 in which one or more embodiments may be implemented. Computer system 100 includes one or more applications 101 that are running on top of system software 110. System software 110 includes a kernel 111 (also referred to herein as "system software kernel"), drivers 112 and other modules 113 that manage hardware resources provided by a hardware platform 120. In one embodiment, system software 110 is an operating system (OS), such as operating systems that are commercially available. In another embodiment, system software 110 is a hypervisor that supports virtual machine applications running thereon, e.g., a hypervisor that is included as a component of VMware's vSphere® product, which is commercially available from VMware, Inc. of Palo Alto, Calif. Hardware platform 120 includes one or more physical central processing units (pCPUs) 121, system memory 122 (e.g., dynamic random access memory (DRAM)), read-only-memory (ROM) 123, one or more network interface cards (NICs) 124 that connect computer system 100 to a network 130, and one or more host bus adapters (HBAs) 126 that connect to storage device(s) 127, which may be a local storage device or provided on a storage area network. In the descriptions that follow, pCPU denotes either a processor core, or a logical processor of a multi-threaded physical processor or processor core if multi-threading is enabled.

In the embodiments illustrated herein, computer system 100 is configured in accordance with the unified extensible firmware interface (UEFI) specification. In one embodiment, computer system 100 is booted from the storage device 127 in accordance with boot firmware stored in ROM 123. In another embodiment, computer system 100 is booted from the network in accordance with platform boot firmware stored in ROM 123.

Figure 2:
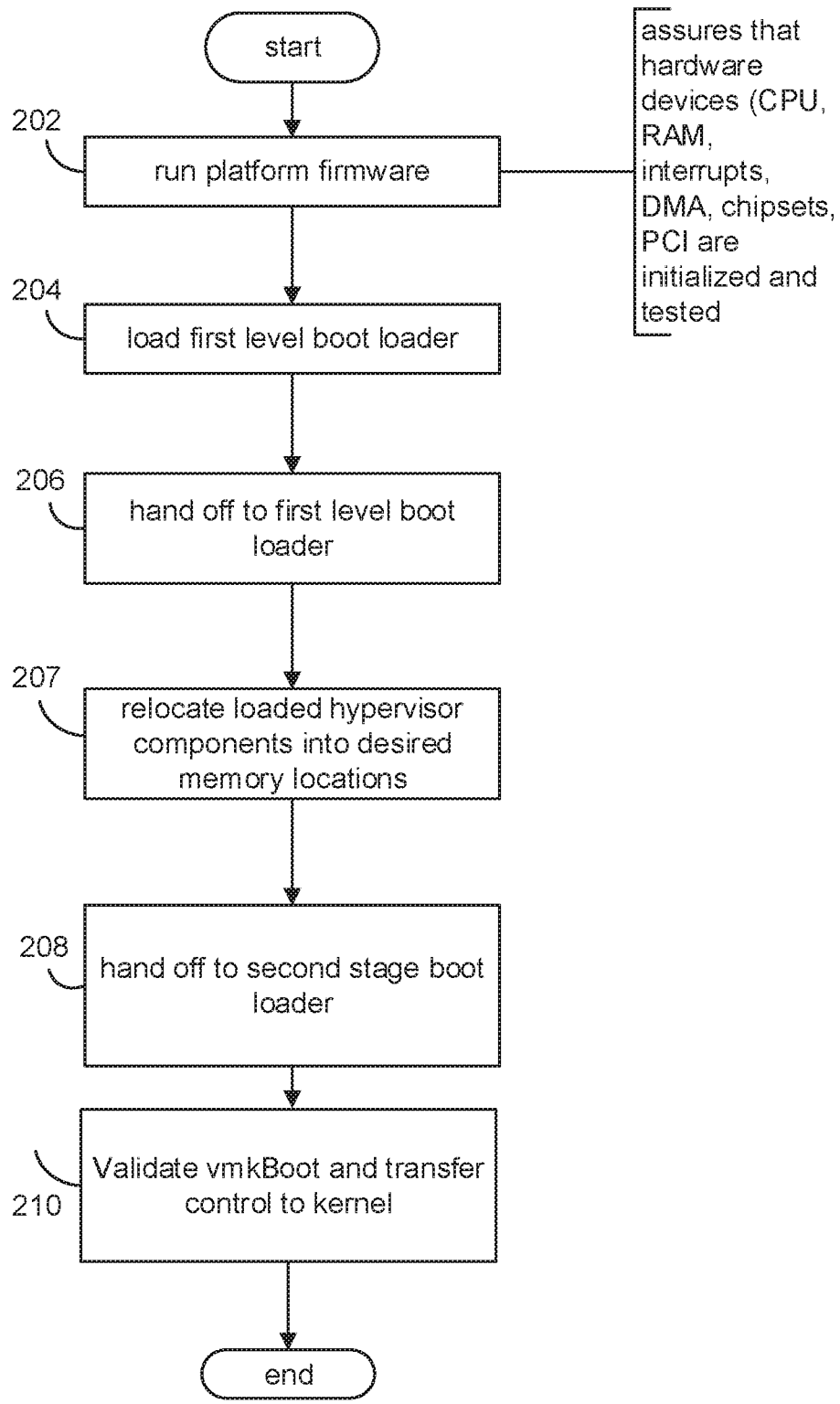
FIG. 2 is a flow diagram of a process for booting a computer system according to one or more embodiments.

During booting, the platform boot firmware carries out the functions of initializing and testing the various hardware devices, RAM, interrupts, DMA, chipsets, and PCI devices and controllers for correct operation. The boot process according to an embodiment involves the steps depicted in a method 200 shown in FIG. 2. One of pCPUs designated at the boot processer executes, in step 202, the platform boot firmware. The platform boot firmware provides two types of services—boot services and run-time services—code and data for which are loaded into system memory 122 and identically mapped to the virtual address space of the platform boot firmware. One of the boot services is power-on self-test (POST), which is carried out at step 202 to confirm that all of the hardware devices are in working order and properly initialized. Platform boot firmware determines, in step 204, the location of a first-stage bootloader and loads the first-stage bootloader into system memory 122. As explained earlier, the first-stage bootloader may be a UEFI first-stage bootloader. Platform boot firmware hands off, in step 206, execution control to UEFI first-stage bootloader. The job of UEFI first-stage bootloader is to load into system memory 122 all of the modules contained in a boot image. The boot-time modules to be loaded into system memory 122 include a UEFI second stage bootloader (vmkBoot), system software modules, which include kernel 111 that is caused to take over control of the computer system 100 (and which may be considered a part of an OS or hypervisor) when vmkBoot is executed, driver modules, which include drivers 112, and user application modules.

UEFI first-stage bootloader performs, in step 207, relocating of loaded hypervisor components into desired memory locations. This step may further include loading vmkBoot into system memory 122 and building hand-off structures. vmkBoot is used to validate kernel 111 when control is passed to vmkBoot during the bootloader process. Once kernel 111 has been validated by vmkBoot, control of the computer system 100 can safely pass to kernel 111, to thereby operate as part of the OS or hypervisor of the computer system 100.

Execution control is transferred, in step 208, from UEFI first-stage bootloader to UEFI second stage bootloader. The job of UEFI second level stage loader is to complete the booting process by executing the vmkBoot stored in the system memory 122 by UEFI first-stage bootloader. vmkBoot validates and transfers execution control to kernel 111 in step 210. By way of example, step 208 in FIG. 2 may include the operations shown in steps 735 through 765 in FIG. 7, to be described in detail in a later portion of the specification.

However, prior to passing control from UEFI first-stage bootloader to UEFI second stage bootloader, the UEFI first-stage bootloader copies and modifies the page tables of the platform boot firmware, in order to create new page tables that may be used by kernel 111 and thus the OS/hypervisor that is run on computer system 100.

When creating new page tables from the firmware page tables that UEFI first-stage bootloader uses to perform its tasks, the firmware page tables need to be cleansed as part of a first page table copy operation. Such cleansing may include: a) removing garbage entries (e.g., duplicate entries, or entries not correctly pointing to an address of another page table in a page table hierarchical structure) within those page tables, b) eliminating any aliased memory ranges (e.g., multiple mappings of RAM with different memory and/or cache attributes), c) removing any Execute Never (XN) or Read Only (RO) bits associated with entries in one or more of the firmware page tables, and d) ensuring that the new page table hierarchical structure meets a predetermined hierarchical structure required by kernel 111 (e.g., for x86 platforms, four page table levels, with the root page table at level 4 having 512 entries.

Figure 7:
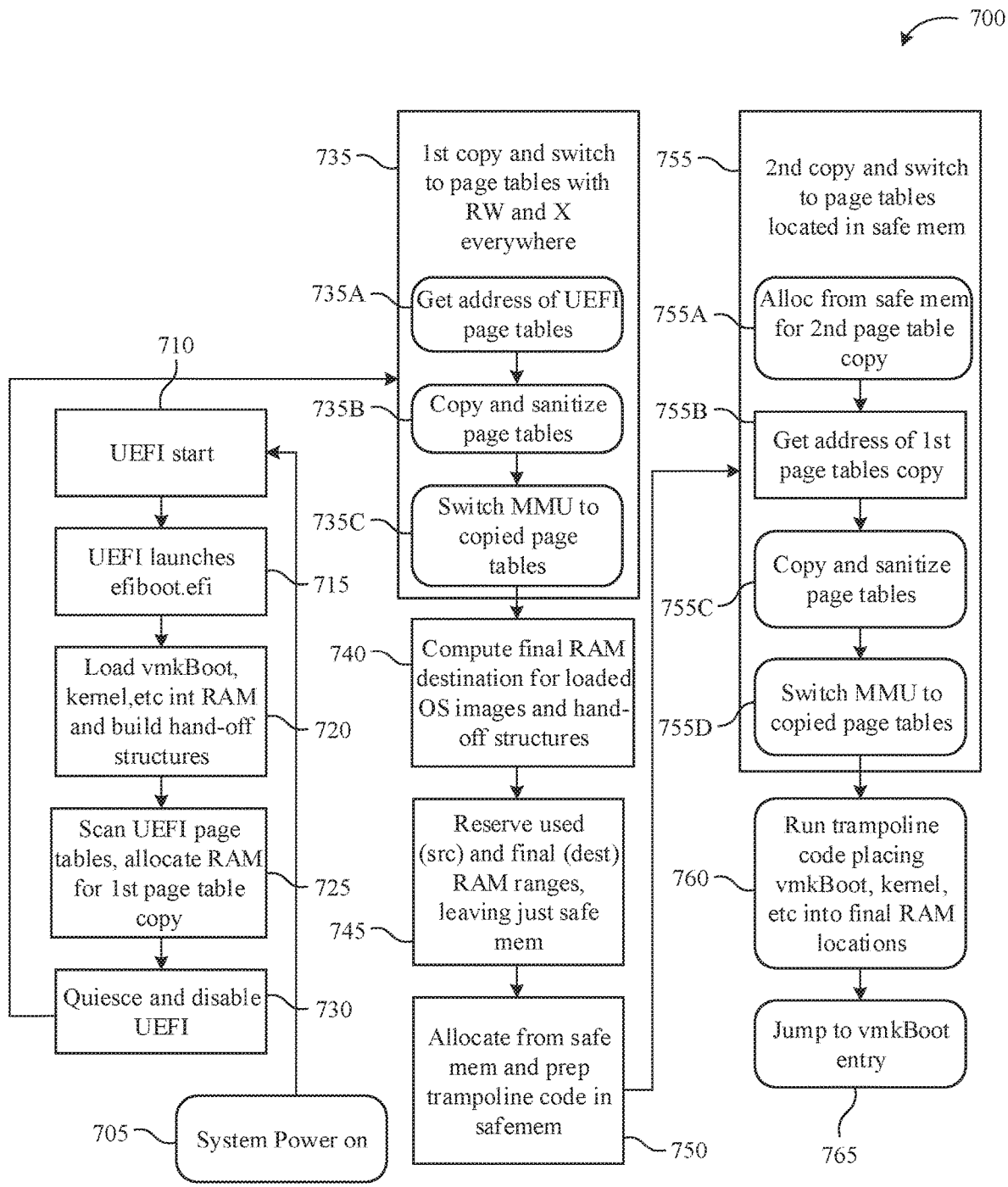
FIG. 7 is a flow diagram showing the steps performed by a first-stage bootloader according to one or more embodiments.

In some implementations, UEFI first-stage bootloader may be run from an external memory such as a CD-ROM, or from a network accessible by the computer system 100, or from a predetermined location in the RAM of system memory 122. As UEFI second stage bootloader is loaded into memory by UEFI first-stage bootloader, UEFI first-stage bootloader is a boot program that is executed when the computer system 100 is powered on, that performs certain boot operations such as shown in FIG. 7, and that creates handoff structures that identify which modules it has loaded into system memory 122 and where those modules are stored in system memory 122. Once the handoff structures have been created, UEFI first-stage bootloader turns off the boot firmware by instructing UEFI to turn itself off, and transitions to vmkBoot, which validates kernel 111 and then hands off control to kernel 111. In order to do this properly, an address space has to be set up in which vmkBoot is to run.

In some ARM® and x86 computer systems, UEFI second stage bootloader is required to be loaded at a predetermined address region in system memory 122, with that address region preferably starting at the 4 Mbyte address (having a physical address equal to a bit string corresponding to the value one followed by 21 zeros, since $2^{22}$=4 Mbytes) in the RAM. That way, when handoff is made to vmkBoot (that is, when UEFI first-stage bootloader passes control to UEFI second stage bootloader), UEFI second stage bootloader is assumed to be located at address region starting at the 4 Mbyte address location, even though there may have been some other data stored in that address region prior to the writing of vmkBoot into the system memory 122.

Further, before handoff is made to vmkBoot, everything that has been written into system memory 122 by UEFI first-stage bootloader should be compacted together and written into proper address locations in system memory 122, as part of the hypervisor booting requirements. Accordingly, before handing off control to vmkBoot, UEFI first-stage bootloader may need to move modules and other components that it has written into system memory 122 so that vmkBoot (and eventually kernel 111) knows where to find those modules and other components, but at the same time avoiding memory addresses that still may be in use by such applications as run-time services that may be operational after boot firmware has shut down.

As one example, if the firmware page tables happen to be located at the 4 Mbyte address region in system memory 122 where vmkBoot is required to be written, then that poses a problem since that might cause a disruption of the firmware page tables if those firmware page tables are overwritten.

To overcome this potential problem, in one embodiment, UEFI first-stage bootloader creates its own page tables from the firmware page tables, e.g., after boot firmware has shut down but before kernel 111 takes over control of the computer system 100. Up to this point in time, the firmware page tables have been used by UEFI first-stage bootloader to write to locations in system memory and to retrieve information from system memory, to set up computer system 100 such that vmkBoot runs properly when handoff is made to that component.

Figure 3:
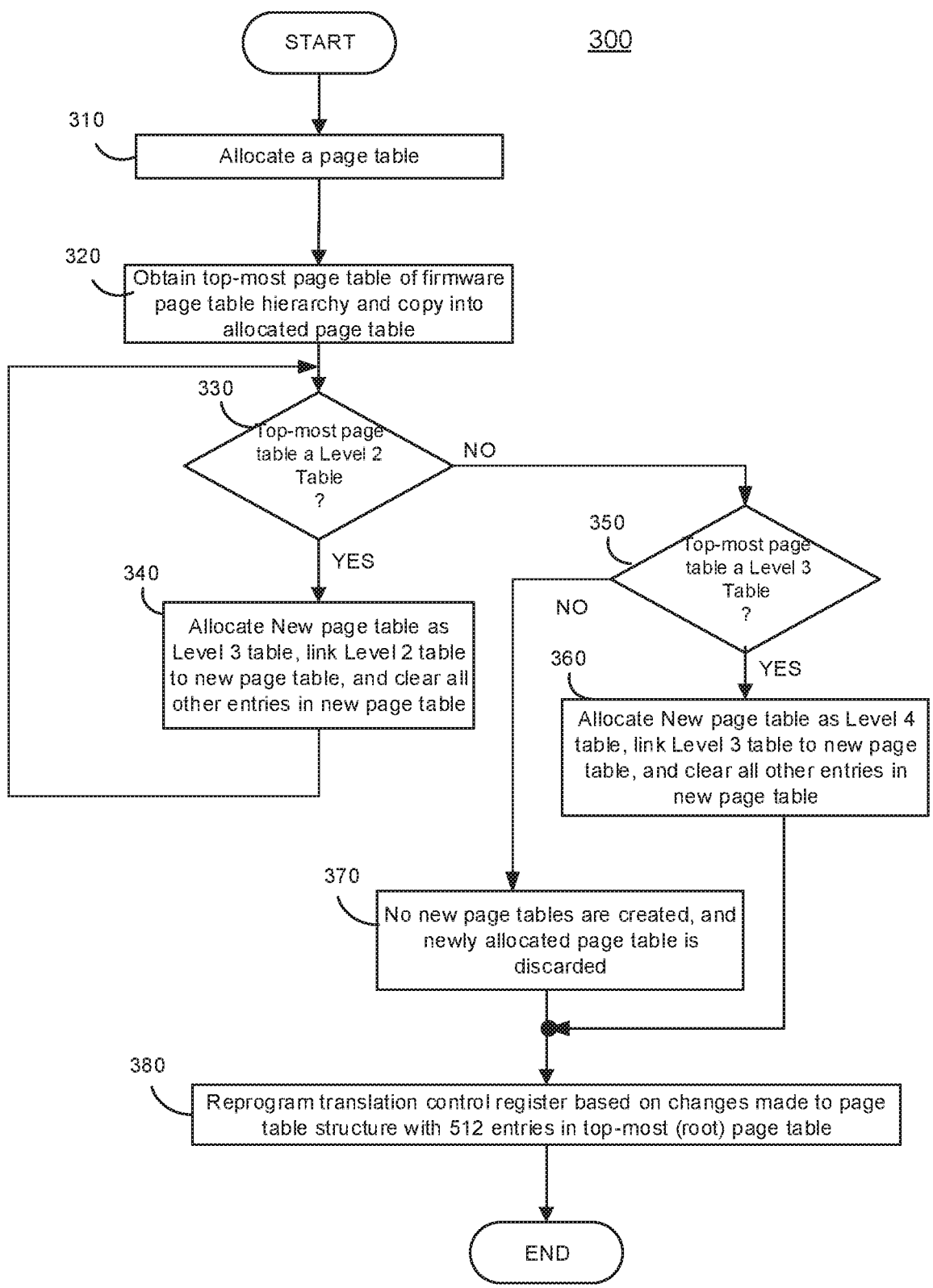
FIG. 3 is a flow chart showing the creation of a new page table structure from a firmware page table structure according to one or more embodiments.

FIG. 3 is a flow chart showing a method 300 of creating of a new page table structure from a firmware page table structure, e.g., when the firmware page table structure does not have four page table levels and 512 entries per page table. In other words, the new page table structure to be created corresponds to an expected page table structure, which is shown in FIG. 3 has having four page table levels, with the page table at the highest (fourth) level having 512 entries within it. This is done so that irrespective as to whether the computer system is an ARM®-based system or an x86-based system, the page table structure for an MMU utilized by vmkBoot would be the same.

Figure 4:
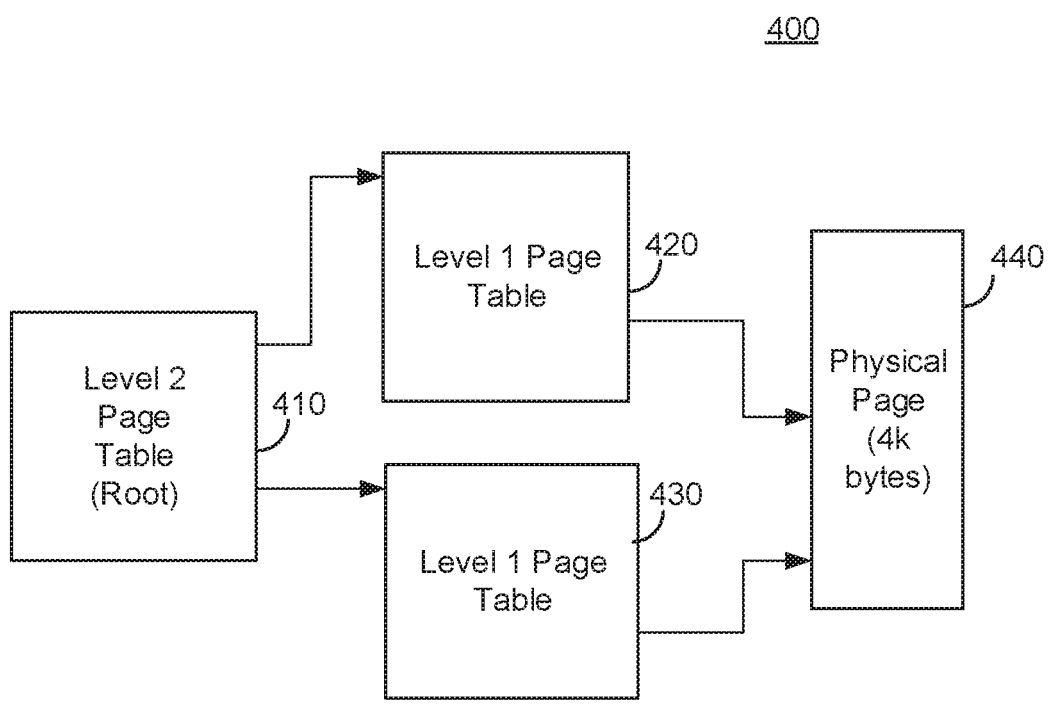
FIG. 4 depicts an example firmware page table hierarchy of two page table levels that may be modified to create a page table hierarchy of four page table levels an example firmware page table hierarchy of two page table levels.

UEFI first-stage bootloader allocates, in step 310, a page table having 512 empty entries. UEFI first-stage bootloader obtains, in step 320, the topmost page table of the firmware page table hierarchy, and its contents are copied into the allocated page table, with the remainder of the allocated page table is cleared to zero values if the topmost page table has less than 512 entries. For example, turning also to FIG. 4 that shows an example firmware page table hierarchy of two page table levels with a root page table 410 at level two and with two page tables 420, 430 at level one, the contents of level 2 page table 410 in FIG. 4 are written into the page table allocated in step 310 of FIG. 3.

UEFI first-stage bootloader determines, in step 330, whether the topmost page table is a level two page table (PML2). If the determination in step 330 is Yes, then the method proceeds to step 340. UEFI first-stage bootloader designates, in step 340, the new page table allocated in step 310 as a new level three (PML3) page table in the new page table structure, and the level two page table is linked to the new PML3 page table (that is, an entry in the new PML3 page table sets forth the address where the level two page table is located). All other entries in the new level 3 page table are cleared to zero values. After step 340 is completed, the method returns to step 330.

If the determination in step 330 is No, the method proceeds to step 350. UEFI first-stage bootloader determines, in step 350, whether the topmost page table is a level three page table (PML3). If the determination in step 350 is Yes, then the method proceeds to step 360. UEFI first-stage bootloader designates, in step 360 the new page table allocated in step 310 as a new level four (PML4) page table in the new page table structure, and the level three page table is linked to the new PML4 page table (that is, an entry in the new PML4 page table sets forth the address where the level three page table is located). All other entries in the new level 4 page table are cleared to zero values.

If the determination in step 350 is No, then no new page tables are created (since the top most page table is a level 4 page table), and the page table allocated in step 310 is not used in the new page table structure and may be discarded, as set forth in step 370.

UEFI first-stage bootloader causes, in step 380, the Translation Control Register (TCR) at the secure level (EL2) or the standard non-secure level (EL1) to be reprogrammed for four full page table levels with 512 entries in the top (fourth) level page table, and the page table root is switched to the level four (top) page table.

Figure 5:
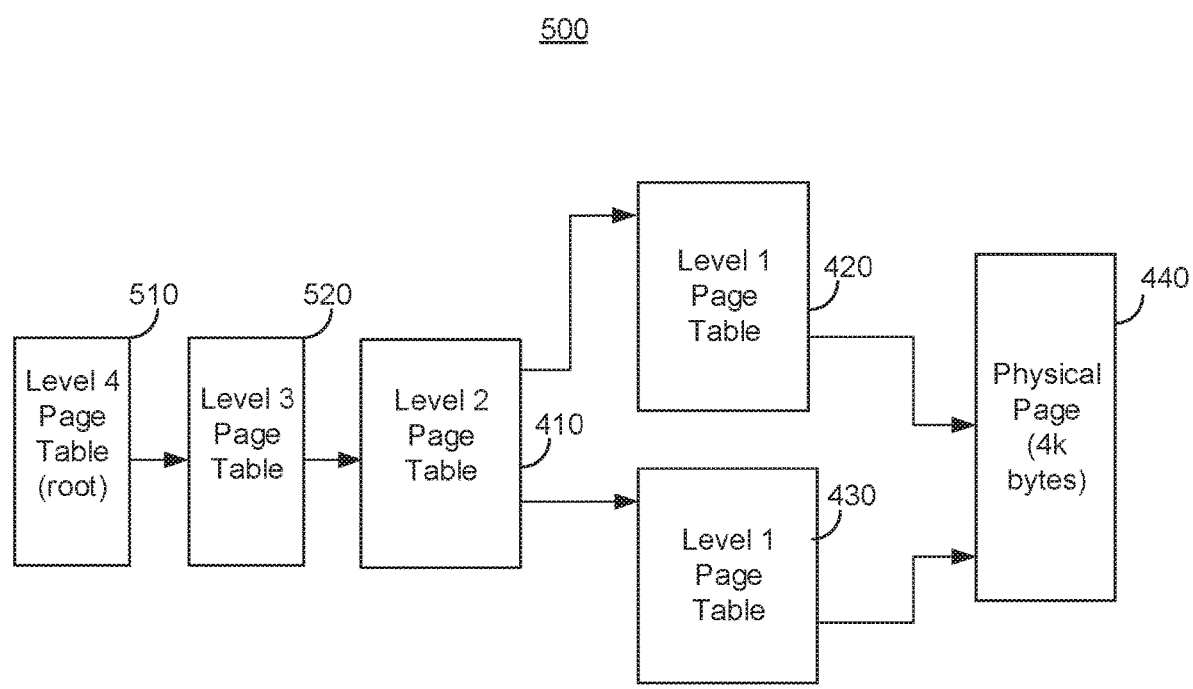
FIG. 5 depicts a four page table level hierarchy created from the two page level hierarchy of FIG. 4 according to one or more embodiments.

Turning again to FIG. 4 with reference also to FIG. 5, the two level page table structure 400 of FIG. 4 is converted to a four level page table structure 500 as shown in FIG. 5, with the creation of a new third level page table 520 that has an entry pointing to the second level page table 410, and with the creation of a new fourth level page table 510 that has an entry pointing to the new third level page table 520.

The new four level page table structure is cleansed and copied into system memory during a first phase of UEFI first-stage bootloader, in which UEFI first-stage bootloader uses UEFI's own memory allocator facilities (e.g., AllocatePages and AllocatePool boot services) instead of the first-stage bootloader's memory. In that sense, UEFI boot firmware is made aware of the memory space used for the page table copy, guarantee that there is no conflict with the boot firmware's own data structures. Once copied, the first-stage bootloader makes the copied page tables be the active page tables used by the MMU. Because the copied page tables are cleansed, the first-stage bootloader will have unrestricted (writeable and executable access) to all system memory, which is necessary for the correct operation of its own memory allocator in second phase of operation.

In the second phase of operation by UEFI first-stage bootloader, in which UEFI first-stage bootloader has exited out of UEFI and now must use its own memory allocator. In this phase, the first-stage bootloader computes the final destinations that loaded hypervisor components need to be moved into. Thus, once all the current (pre-relocation) and future (post-relocation and pre-handoff to vmkBoot) memory regions are blacklisted, the memory allocator is left with memory whose contents will not be touched by the preparatory to handoff step of moving loaded hypervisor components to desired memory locations. Such memory is known as "safe memory".

The page table copy may be blacklisted due to overlapping with some destination addresses for a moved loaded hypervisor component, for example. Thus, a second page table copy is made, using "safe memory" to allocate memory for it.

Figure 6:
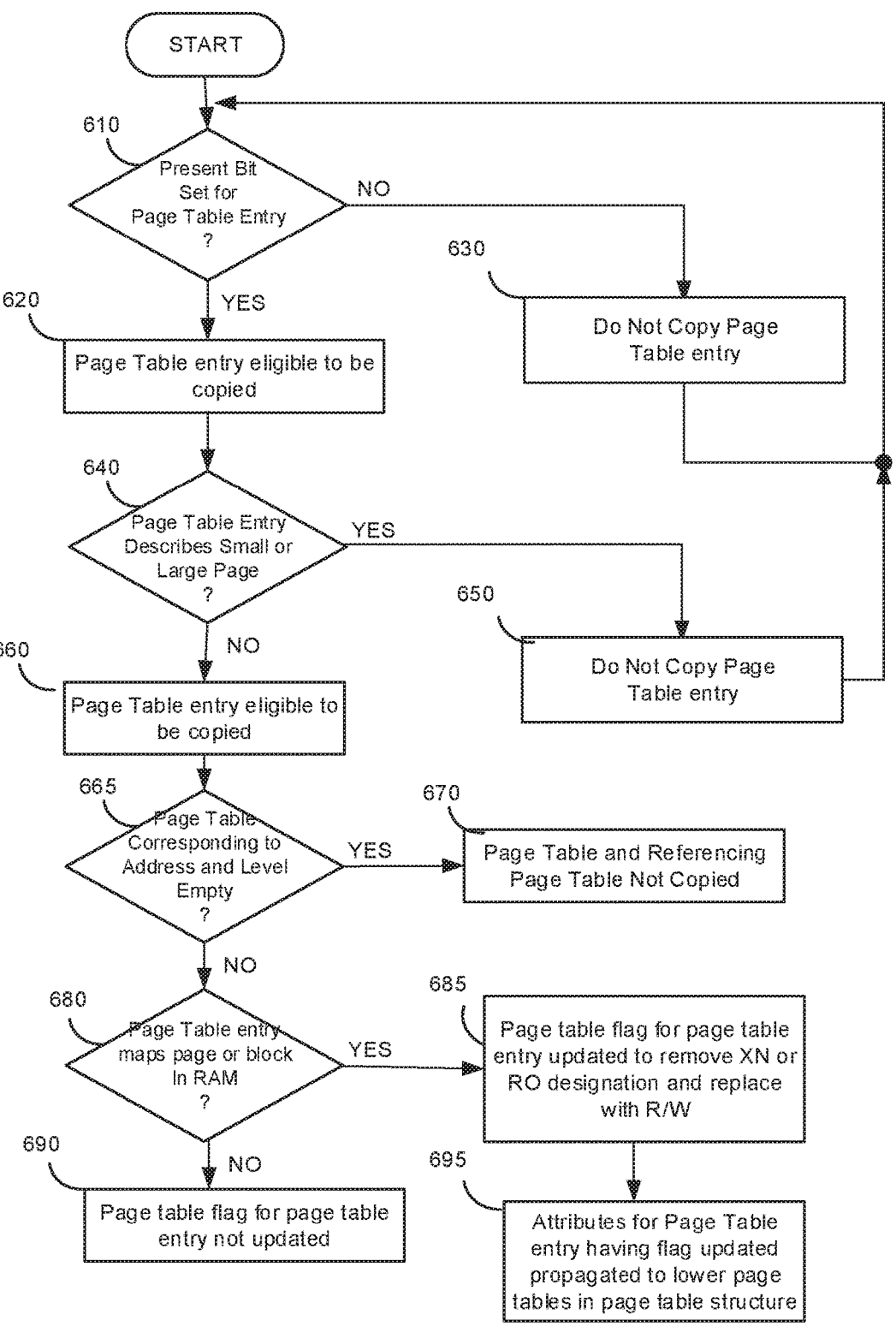
FIG. 6 is a flow diagram showing a page table entry cleansing process that may be performed according to one or more embodiments.

As part of a page table traversal and copy operation, UEFI first-stage bootloader remove garbage and/or aliased entries and/or blank entries. FIG. 6 is a flow diagram showing the traversing and processing of the page tables to remove such extraneous and potentially dangerous data within the page tables. UEFI first stage bootloader examines, in step 610, each page table entry to determine if a Present Bit is set. If the Present Bit is set ('Yes' determination), the method flows to step 620. UEFI first-stage bootloader determines, in step 620, due to the Present Bit being set signifying that the page table points to a page table that is at a lower level in the page table structure (e.g., entry in a level 3 page table pointing to a level 2 page table), that page table entry is eligible for being copied in step 620, and the method flows to step 630 for further analysis of the page table entry. If the Present Bit is not set ('No' determination), then the method flows to step 630. UEFI first-stage bootloader does not copy the page table entry in step 630, and the method returns to step 610 to analyze another page table entry of the page table.

UEFI first-stage bootloader examines, in step 640, the page table entry to determine whether it describes a small page or a large page, and whether the mapping is not Virtual Address=Physical Address (i.e., 1:1 mapping). This occurs when a page table entry does not point to an entry in a lower level table in the page table structure (i.e., the Present Bit is not set). If the determination in step 640 is Yes, the method flows to step 650. UEFI first-stage bootloader does not copy the page table entry in step 650, as it is either a garbage mapping or an alias. If the determination in step 640 is No, the method flows to step 660. UEFI first-stage bootloader determines that the page table entry remains eligible to be copied in step 660, and the method then proceeds to step 665.

UEFI first-stage bootloader determines, in step 665, whether the page table at a next lower level in the page table hierarchy that corresponds to an address specified in the page table entry being examined is empty, which may be the case because it was empty to begin with or because all entries in it were considered garbage data that is invalid. If the determination in step 665 is Yes, the method flows to step 670. UEFI first-stage bootloader causes, in step 670, the page table to not be copied, and also the referencing page table entry in the next-level higher page table is not copied either. If the determination in step 665 is No, the method proceeds to step 680.

UEFI first-stage bootloader determines, in step 680, for each page table entry, whether or not the respective page table entry maps to a page or block in memory. For each page table entry in a page table that maps to a page or block in memory ("Yes" determination in step 680), the method flows to step 685. UEFI first stage bootloader updates the page table flag associated with the page table entry such that an XN or RO designation for that page table entry is removed and replacing it with R/W (Read-Write), and the process then flows to step 695 (discussed below). For each page table entry in the page table that maps a region in system memory not in memory ("NO" determination in step 680), the process flows to step 690. UEFI first-stage bootloader does not update, in step 680, the page table flag associated with the page table entry in which the page table flag associated to R/W, whereby the page table flag is kept "as is". This is important as it guarantees mappings of device memory mapped I/O are not accidentally made executable, which frequently causes a fatal error condition on architectures such as ARM.

UEFI first-stage bootloader propagates, in step 695, the attributes for the page table entries that have their respective page table flags updated down to lower page tables in the multi-level page table structure. After step 695 is completed for each page table in the page table structure, the page table structure is available for use by vmkBoot, and handoff control from the first-stage bootloader to vmkBoot may then be made.

By performing two separate copy and moves of firmware page tables in the system memory and by modifying the firmware page tables so that they may be used properly by vmkBoot, an effective way to deal with potential problems with page tables being located in restricted areas or memory may be achieved. The first page table copy and move operation may be performed by UEFI first-stage bootloader while the boot firmware is still operational, since the boot firmware address allocator is aware of the areas of system memory that are writable and thus do not cause a problem with the boot firmware if modules or data structures, or, in this instance, page tables are written into such "firmware safe" areas of system memory. Then, after UEFI has finished and the boot firmware is no longer operational, a second page table copy and move operation may be performed to ensure that the page tables do not interfere with boot firmware memory locations and with other memory locations of boot modules and the like that may have been written into RAM and that are not known to the boot firmware address allocator (but which are known to the UEFI first-stage bootloader address allocator).

Additionally, by doing a cleansing of the page tables to remove extraneous entries in the page tables, and to remove garbage entries in the page tables, an optimal page table structure is created for the virtual machine after UEFI exits but before handoff to vmkBoot and thereby to the kernel 111 validated by vmkBoot.

FIG. 7 is a flow diagram describing a method 700 performed by UEFI first-stage bootloader according to one or more embodiments. These steps occur after system power on (step 705). After system power on is detected, UEFI boot process starts, as indicated by step 710, and thereafter the method flows to step 715.

UEFI first-stage bootloader launches, in step 715, efiboot.efi boot module, and then the method flows to step 720. UEFI first-stage bootloader executes, in step 720, efiboot.efi boot module, which results in loading of vmkBoot, kernel, etc., into memory, and step 720 further comprises building hand-off structures. After completion of step 720, the method flows to step 725.

UEFI first-stage bootloader scans, in step 725, UEFI page tables (firmware page tables), and allocates regions of memory for the first page table copy described above, and afterward the method flows to step 730. UEFI first-stage bootloader quiesces (e.g., pauses and thereby disables from being executed) UEFI in Step 730, such that UEFI is paused from executing and no longer has control of the machine. The method then flows to step 735.

UEFI first-stage bootloader performs, in step 735, the first page table copy operation (described hereinabove) into regions of memory that are mapped such that those regions of memory can be written to, can be read from, and can contain instructions that can be executed by a CPU. In more detail, step 735 includes a step 735A of obtaining the addresses of the UEFI page tables, a step 735B of copying and sanitizing the UEFI page tables, and a step 735C of switching MMU to the copied page tables. The method then flows to step 740.

UEFI first-stage bootloader computes, in step 740, using the first copy of the page tables, a first memory destination for loaded OS images and hand-off structures. The method then flows to step 745.

UEFI first-stage bootloader reserves, in step 745, used (e.g., source) and final (e.g., destination) memory address ranges, leaving "safe memory" that comprises all other unreserved address ranges in memory. The method then flows to step 750.

UEFI first-stage bootloader allocates, in step 750, address regions from safe memory and loads a trampoline code in the allocated safe memory. The method then flows to step 755. The trampoline code may be used, for example, to jump to a "safe memory" from a potentially non-safe region of memory.

UEFI first-stage bootloader performs, in step 755, the second page table copy operation described above into regions of memory that are designated as "safe memory". In more detail, step 755 includes a step 755A of allocating, from safe memory, memory address regions for the second page table copy, a step 755B of getting the memory address of the first page table copies, a step 755C of copying and sanitizing the first page table copies to obtain second page table copies, and a step 755D of switching MMU to the second copied page tables. After completion of step 755, the method flows to step 760.

UEFI first-stage bootloader runs, in step 760, trampoline code that places vmkBoot, kernel, etc. into the final memory. After completion of step 760, the method flows to step 765.

Execution of trampoline code causes jumping, in step 765, to vmkBoot entry, effectively handing off boot control to UEFI second stage bootloader to continue the boot process.

Figure 8:
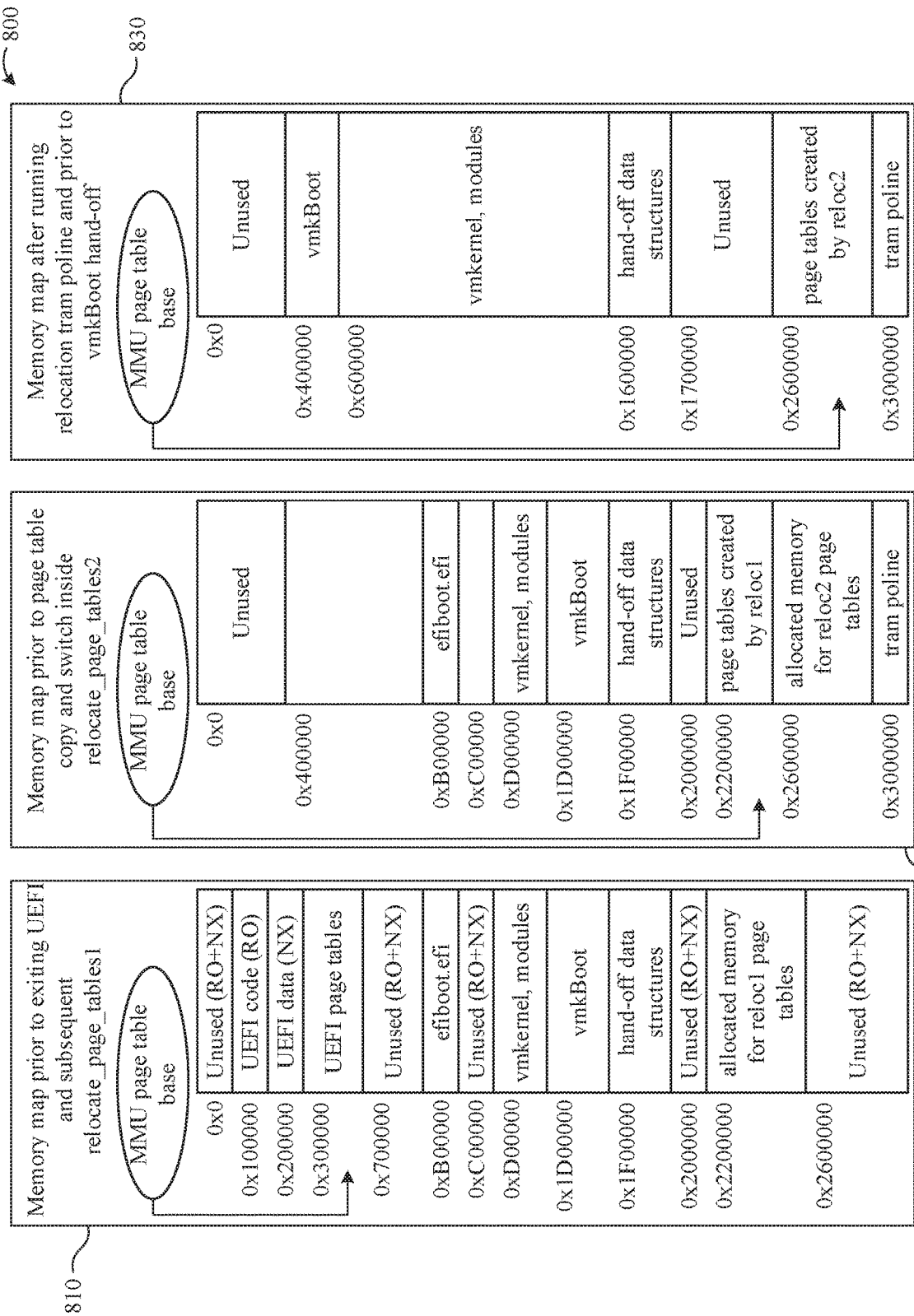
FIG. 8 is a diagram showing illustrative memory mappings during different stages of a computer system boot operation, according to one or more embodiments.

FIG. 8 is a diagram showing an illustrative memory mapping during different stages of a computer system boot operation, according to one or more embodiments. In more detail, the left column memory mapping 810 shows a memory map prior to UEFI control, a memory mapping used by system boot firmware. The middle column memory mapping 820 shows a memory map prior to first page table copying and relocating of the UEFI page tables in memory, as used by UEFI first-stage bootloader. The right column memory mapping 830 shows a memory map after second page table copying and running relocation trampoline, but prior to vmkBoot handoff, for use by the kernel. The MMU page table base is shown between memory address 0x22000000 address and memory address 0x2600000 address in memory for the UEFI page tables in memory mapping 810, the MMU page table base is shown between memory address 0x22000000 address and memory address 0x2600000 address in memory in memory mapping 820, and the MMU page table base is shown between memory address 0x26000000 address and memory address 0x3000000 address in memory in memory mapping 830.

Referring to memory mapping 810 and memory mapping 820, the UEFI page tables are copied, in a first page table copy operation, into a region of memory allocated for relocated page tables, corresponding to a memory region between memory address 0x22000000 address and memory address 0x2600000 address in memory. The middle column memory mapping 820 shows that the second page table copy of the first page tables is to be placed into the memory region between address 0x2600000 and address 0x3000000 in memory. The right column memory mapping 830 shows the second copy of page tables written into the "safe" memory region between address 0x2600000 and address 0x3000000 in memory, with the kernel and modules moved to their expected destination memory region in memory from where they were located in the left column memory mapping 810 and the middle column memory mapping 820.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for booting a machine, the method comprising:
   executing boot firmware, which hands off control to a first-stage bootloader;
   executing, by the first-stage bootloader, first-stage bootloader operations using firmware page tables set up by the boot firmware;
   after completion of the first-stage bootloader operations but prior to handing off control of the machine to a second-stage bootloader, moving the firmware page tables from a first address region in a memory of the machine to a second address region in the memory;
   creating an updated set of page tables in the second address region of the memory by modifying a hierarchical structure of the firmware page tables to have an expected number of page table levels; and
   modifying page table entries in each page table of the updated set of page tables such that each page table entry is accessible by a system software kernel of the machine when control of the machine is handed off from the second-stage bootloader to the system software kernel.

2. The method of claim 1, further comprising:
   allocating a third region in the memory for storing the updated set of page tables by the first-stage bootloader.

3. The method of claim 2, further comprising:
   after completion of the first-stage bootloader operations by the first-stage bootloader, handing off control to the second-stage bootloader.

4. The method of claim 3, wherein handing off control of the machine by the first-stage bootloader to the second-stage bootloader comprises ceasing any executable functions by the first-stage bootloader on the machine.

5. The method of claim 4, further comprising:
   reprogramming a translation control register (TCR) to be used for memory mapping by the first-stage bootloader based on modifications made to the firmware page tables.

6. The method of claim 5, wherein modifying the page table entries in each page table of the updated set of page tables further comprises:
   changing a page table flag in a page table entry of the page table entries to indicate Read/Write Access instead of Execute Never (XN) Access or Read Only (RO) Access.

7. The method of claim 6, wherein modifying the page table entries in each page table of the updated set of page tables further comprises:
   erasing a page table entry of the page table entries in response to the page table entry pointing to
   a page table having a physical address that is not within an address range of a random access memory (RAM) portion of the memory.

8. The method of claim 7, further comprising:

erasing a first page table of the updated set of page tables that does not have any non-zero entries; and updating a higher-level page table in the updated set of page tables, the higher-level page table referencing the first page table, such that a page table entry pointing to the first page table is removed from the higher-level page table.

9. The method of claim 1, wherein creating the updated set of page tables comprises:

allocating a first page table;

determining a level of a firmware root page table is less than a predetermined page table level, the firmware root page table being a highest level page table in the hierarchical structure comprising the firmware page tables;

assigning, in response to determining the level of the firmware root page table is less than the predetermined page table level, the first page table to a page table level that is one level higher than the root page table, and creating a link as an entry in the first page table to the firmware root page table;

determining the first page table is assigned to a page table level that is less than the predetermined page table level; and allocating, in response to the page table level of the first page table being less than the predetermined page table level, a second page table and setting the second page table to a page table level one level higher than the first page table, and creating a link as an entry in the second page table to the first page table.

10. The method of claim 1, wherein modifying the page table entries in each page table of the updated set of page tables comprises:

removing a page table entry of the page table entries in response to the page table entry having a Present bit that is not set.

11. The method of claim 1, further comprising:

performing, by the second-stage bootloader after the first-stage bootloader has completed the first-stage bootloader operations, a launching of system software on the machine by executing the system software kernel.

12. A non-transitory computer readable medium comprising instructions for booting a machine, wherein the instructions, when executed by the machine, cause the machine to:

execute boot firmware, which hands off control to a first-stage bootloader;

execute, by the first-stage bootloader, first-stage bootloader operations using firmware page tables set up by the boot firmware;

after completion of the first-stage bootloader operations but prior to handing off control of the machine to a second-stage bootloader, move the firmware page tables from a first address region in a memory of the machine to a second address region in the memory;

create an updated set of page tables in the second address region of the memory by modifying a hierarchical structure of the firmware page tables to have an expected number of page table levels; and modify page table entries in each page table of the updated set of page tables such that each page table entry is accessible by a system software kernel of the machine when control of the machine is handed off from the second-stage bootloader to the system software kernel.

13. The non-transitory computer readable medium of claim 12, wherein the instructions, when executed by the machine, further cause the machine to:

allocate a third address region in the memory for storing the updated set of page tables by the first-stage bootloader.

14. The non-transitory computer readable medium of claim 13, wherein the instructions, when executed by the machine, further cause the machine to:

after completion of the first-stage bootloader operations by the first-stage bootloader, hand off control to the second-stage bootloader.

15. The non-transitory computer readable medium of claim 14, wherein the system software kernel is a part of an Operating System (OS) of the machine or a hypervisor of the machine.

16. The non-transitory computer readable medium of claim 13, wherein the instructions, when executed by the machine, further cause the machine to:

cause the second-stage bootloader to perform, after the first-stage bootloader has completed the first-stage bootloader operations, launching of the system software kernel.

17. The non-transitory computer readable medium of claim 13, wherein the instructions, when executed by the machine, further cause the machine to:

reprogram a translation control register (TCR) to be used for memory mapping by the first-stage bootloader based on modifications made to the firmware page tables.

18. The non-transitory computer readable medium of claim 13, wherein modifying the page table entries in each page table of the updated set of page tables comprises:

removing a page table entry of the page table entries in response to the page table entry having a Present bit that is not set.

19. A computer system, comprising:

a system memory; and a processor configured to:

execute boot firmware, which hands off control to a first-stage bootloader;

execute, by the first-stage bootloader, first-stage bootloader operations using firmware page tables set up by the boot firmware;

after completion of the first-stage bootloader operations but prior to handing off control of the machine to a second-stage bootloader, move the firmware page tables from a first address region in the system memory to a second address region in the system memory;

create an updated set of page tables in the second region of the system memory by modifying a hierarchical structure of the firmware page tables to have an expected number of page table levels; and modify page table entries in each page table of the updated set of page tables such that each page table entry is accessible by a system software kernel when control of the computer system is handed off from the second-stage bootloader to the system software kernel.

20. The computer system of 19, the processor further configured to:

allocate a third address region in the system memory for storing the updated set of pages tables by the first-stage bootloader.

* * * * *